Sept. 20, 1960    J. WHITE    2,952,936
FISHING SPINNERS
Filed Jan. 14, 1958
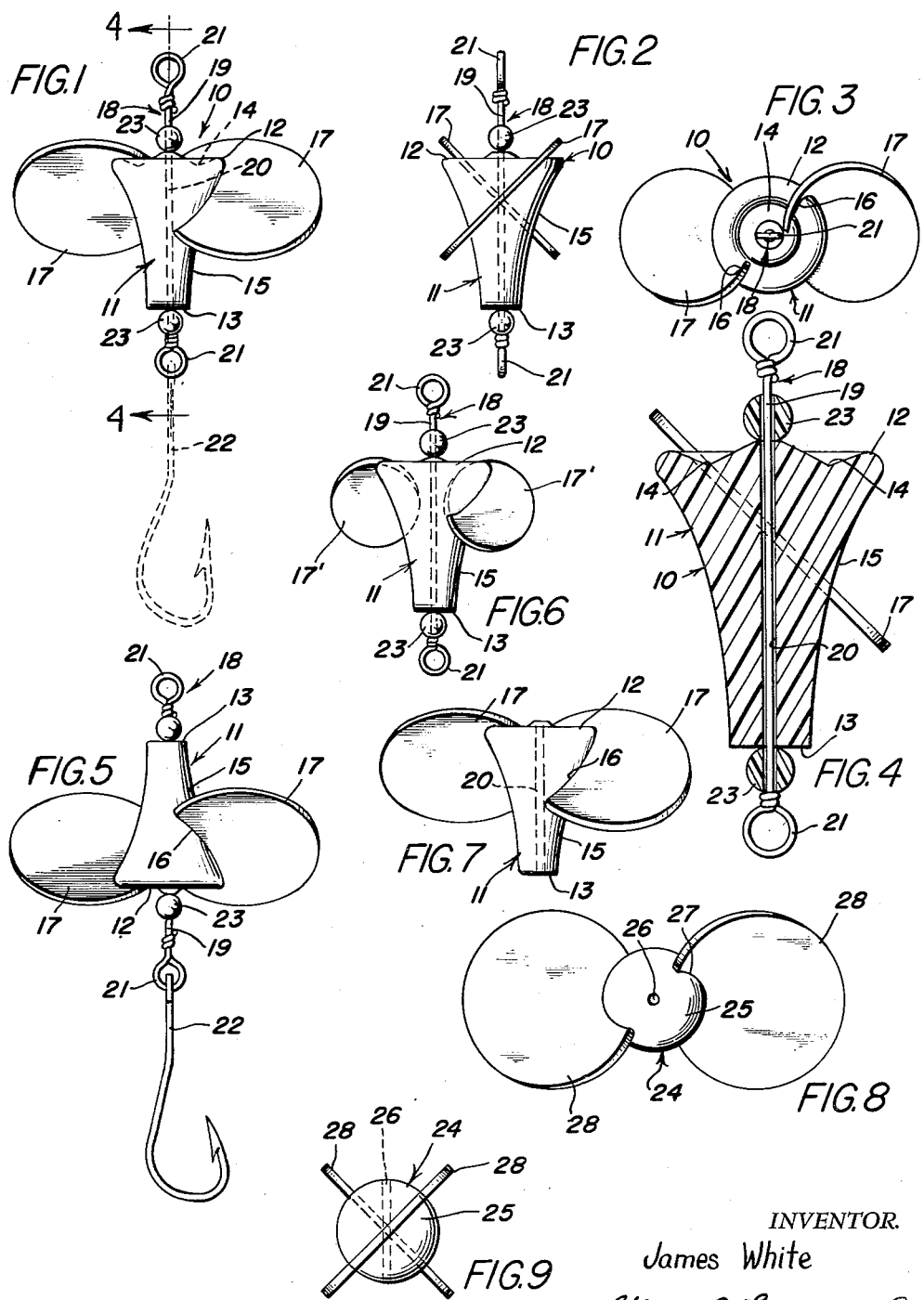
INVENTOR.
James White
BY *Victor J. Evans & Co.*
ATTORNEYS United States Patent Office 2,952,936
Patented Sept. 20, 1960

2,952,936
FISHING SPINNERS
James White, 2700 Modrona St., Bellingham, Wash.
Filed Jan. 14, 1958, Ser. No. 708,945
2 Claims. (Cl. 43—42.21)

This invention relates to fishing accessories, and more particularly to fishing spinners.

The object of the invention is to provide fishing spinners which are adapted to be used when fishing whereby there is provided a highly attractive lure or spinner which will help attract fish to the fishhook.

Another object of the invention is to provide fishing spinners which are adapted to be made of a suitable material such as brightly colored plastic material, and wherein the spinners include a rotary member which has vanes or blades connected thereto, so that when the spinners are in the water, the vanes will cause rotation of the member which will create a highly effective lure so that fish will be attracted to a fishhook which may have bait thereon.

A further object of the invention is to provide fishing spinners which are extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating one of the fishing spinners of the present invention.

Figure 2 is a view taken at right angles to the view shown in Figure 1.

Figure 3 is a plan view of the spinner of Figures 1 and 2.

Figure 4 is a sectional view taken on the line 4—4 of Figure 1.

Figure 5 is a view showing the spinner of Figure 1 in reverse position.

Figure 6 is an elevational view illustrating a modification.

Figure 7 is an elevational view showing the body member and vanes.

Figure 8 is a plan view of another modified spinner or lure.

Figure 9 is an elevational view of the spinner of Figure 8.

Referring in detail to the drawings, the numeral 10 indicates a fishing spinner or lure, and the spinner 10 includes a body member 11 which has a shape that resembles a bell. Thus, the body member 11 includes a large end 12 and a smaller end 13, and the large end 12 is provided with an annular groove or recess 14, Figure 3. The outer surface of the body member 11 is contoured or recessed arcuately as at 15, and the body member 11 is provided with opposed slots 16. The numeral 17 indicates vanes or blades which are secured within the slots 16.

There is further provided a support member that is indicated generally by the numeral 18. The support member 18 includes a straight portion 19 which extends through a longitudinally extending bore 20 in the body member 11. The support member 18 has its ends shaped to define eyelets 21, and a fishhook 22 may be connected to one of the eyelets 21, while a fishing line may be connected to the other eyelet. The numeral 23 indicates spherical beads which are mounted on the support member 18 on opposite sides of the body member 11.

In Figure 6 the spinner is shown equipped with vanes 17' which may be smaller or of a different size from the vanes 17, and the spinner of Figure 6 may be used in a manner similar to the spinner shown in Figure 1.

In Figure 5 the spinner is shown in a reversed position from that shown in Figure 1 so that in Figure 5 the large end of the body member 11 is down instead of being up and when desired, the spinner can be used in the position of Figure 5 or else it can be used with the parts in the position of Figure 1.

In Figure 7 the spinner is shown without the support member 18 so that when the spinner is sold in a store or the like, it may be sold with or without the support member 18 as desired.

Referring to Figures 8 and 9 of the drawings there is shown a modified spinner which is indicated generally by the numeral 24, and the spinner 24 includes a spherical body member 25 which is provided with a central bore 26 so that a member such as the support member 18 can be extended therethrough. The body member 25 is provided with opposed slots 27, and vanes 28 are secured within the slots 27, the vanes 28 being arranged in crisscross relation with respect to each other as shown in Figure 9. Similarly, the previously described vanes 17 are arranged in crisscross relation or angular relation with respect to each other.

From the foregoing, it is apparent that there has been provided fishing spinners which are arranged and constructed in such a manner that fish will be attracted to a hook such as the hook 22. In use, when the lure or spinner 10 is being used, the upper eyelet 21 may be connected to a fishing line, and the lower eyelet 21 may have a fishhook 22 connected thereto. Then, with the portion 19 of the support member 18 extending through the bore 20 in the body member 11, it will be seen that when the spinner moves through the water, the vanes 17 will cause rotation of the body member 11, and the vanes 17 and body member 11 will rotate on the portion 19 of the support member 18, and this will create turbulence or a swirling effect in the water so that fish will be attracted to the hook 22 whereby such fish can be caught with greater ease or convenience.

It is to be noted that the spinner 10 includes the bell shaped body member 11 which has the groove 14 therein, and the shape of the body member 11 as well as the provision of the groove 14 insures that when the spinner is drawn or pulled through the water, there will result in a highly turbulent or swirling effect which will prove highly attractive to fish. The beads 23 provide a type of bearing and the bore 20 is of such a size that the body member 11 is free to rotate on the portion 19 of the support member 18. The curvature 15 also provides that the spinner will have a construction which will increase the turbulence of the water so that fish will be attracted to strike the hook 22. The hook 22 may be used with a suitable type of bait as desired. Preferably the parts such as the body member 11 are made of a brightly colored plastic which will further enhance the attractiveness of the device so that the spinner will be more appealing to fish. The spinner may be used in the position of Figure 1, or else the device can be used with the parts shown in the position of Figure 5 so that the small end 13 is on top. As illustrated in Figure 7, the device may be sold without the support member 18, and then the support member 18 can be installed by the fisherman when desired.

In the modification of Figures 8 and 9, instead of using a bell shaped body member, a spherical body member 25 is utilized. The pair of vanes 28 are arranged in crisscross relation with respect to each other as shown in Figure 9, and the body member 25 has a bore 26 which can be used for receiving a portion of a support member such as the support member 18.

The parts can be made of any suitable material and in different shapes or sizes. The spinner may be painted or made from materials which are highly attractive and the color may be varied as desired. The spinners will work in either direction, forwards or backwards. The spinners can be used when casting and they can also be used as bait drifters, and they can also be used when trolling. If desired, the fisherman may install his own leader. The spinners will work efficiently in fast or slow waters and they will not lose their shape or come apart and the material may be made so that the color thereof does not deteriorate or change even after the device has been in use for long periods of time. Any type of hook or hooks can be used with the spinners. In Figure 6 the vanes 17' may be of smaller size than the previously described vanes 17. The groove 14 also helps increase water resistance so as to increase the efficiency of the device as it moves through the water. The spinning motion imparted to the lure will help attract fish to the hook. Also, the device can be used with different types of bait such as fresh or live bait or else artificial bait or lures can be used with the spinners.

Minor changes in shape, size and rearrangement of details coming within the field of invention claimed may be resorted to in actual practice, if desired.

I claim:

1. In a fishing spinner, a body member having a bell shaped formation and said body member including a large leading end and a smaller trailing end, the outer surface of said body member between said large and smaller ends being recessed arcuately, there being an annular groove in the large end of said body member, said body member having a longitudinally extending bore therein, a support member having a straight portion extending through said bore and said support member having eyelets on the ends thereof, spherical beads arranged on opposite sides of said body member and said beads being mounted on said support member, there being opposed slots in said body member, and vanes having portions thereof secured in said slots.

2. In a fishing spinner, a body member having a bell shaped formation and said body member including a large leading end and a smaller trailing end, the outer surface of said body member between said large and smaller ends being recessed arcuately, there being an annular groove in the large end of said body member, said body member having a longitudinally extending bore therein, a support member having a straight portion extending through said bore and said support member having eyelets on the ends thereof, spherical beads arranged on opposite sides of said body member and said beads being mounted on said support member, there being opposed slots in said body member, and vanes having portions thereof secured in said slots, said vanes being arranged in crisscrossed relation with respect to each other.

References Cited in the file of this patent

UNITED STATES PATENTS

| 1,562,439 | Crawford | Nov. 24, 1925 |
| 2,055,841 | Haislip | Sept. 29, 1936 |
| 2,804,713 | Johnson | Sept. 3, 1957 |

FOREIGN PATENTS

| 13,247 | Great Britain | 1910 |
| 646,413 | France | 1928 |